(12) United States Patent
Riemann et al.

(10) Patent No.: US 8,946,583 B2
(45) Date of Patent: Feb. 3, 2015

(54) ANGLED CUT HEIGHT CONTROL SYSTEM FOR A PLASMA ARCH TORCH

(75) Inventors: Jeffrey Lawrence Riemann, San Diego, CA (US); Paul L. Riemann, Valley Center, KS (US); Nicholas Lee Riemann, Park City, KS (US)

(73) Assignee: Retro Systems, LLC, Valley Center, KS (US)

( * ) Notice: Subject to any disclaimer, the term of this patent is extended or adjusted under 35 U.S.C. 154(b) by 769 days.

(21) Appl. No.: 13/116,997

(22) Filed: May 26, 2011

(65) Prior Publication Data

US 2012/0298632 A1    Nov. 29, 2012

(51) Int. Cl.
  *B23K 10/00*  (2006.01)
  *B23K 37/02*  (2006.01)
(52) U.S. Cl.
  CPC ............... *B23K 10/00* (2013.01); *B23K 10/006* (2013.01); *B23K 37/0241* (2013.01)
  USPC ............ 219/121.44; 219/121.56; 219/121.39; 219/121.59
(58) Field of Classification Search
  CPC ............. H05H 1/26; H05H 1/32; H05H 1/36; B23K 10/00; B23K 10/02; B23K 11/258
  USPC ............. 219/121.39, 121.44, 121.59, 121.54, 219/121.46
  See application file for complete search history.

(56) References Cited

U.S. PATENT DOCUMENTS

| | | | |
|---|---|---|---|
| 4,101,754 A | 7/1978 | Fischer | |
| 4,284,871 A | 8/1981 | Mawson | |
| 4,324,971 A | 4/1982 | Frappier | |
| 4,766,286 A * | 8/1988 | Iceland | 219/121.57 |
| 4,795,882 A | 1/1989 | Hardwick | |
| 5,288,970 A | 2/1994 | Nishi | |
| 5,371,336 A | 12/1994 | Albert et al. | |
| 5,481,081 A | 1/1996 | Ikegaya | |
| 5,550,344 A | 8/1996 | Winterfeldt | |
| 5,998,757 A | 12/1999 | Schneider | |
| 6,028,287 A * | 2/2000 | Passage et al. | 219/121.56 |
| 6,201,207 B1 | 3/2001 | Maruyama | |
| 6,326,583 B1 | 12/2001 | Hardwick | |
| 6,329,628 B1 | 12/2001 | Kuo et al. | |
| RE37,608 E | 3/2002 | Solley | |
| 6,914,209 B2 | 7/2005 | Yamaguchi et al. | |
| 7,071,441 B1 * | 7/2006 | Bulle | 219/121.39 |
| 7,087,855 B2 * | 8/2006 | Yamaguchi et al. | 219/121.39 |
| 7,138,600 B2 | 11/2006 | Kwon et al. | |
| 8,006,403 B2 * | 8/2011 | Anderson | 33/556 |
| 8,304,684 B2 * | 11/2012 | Currier et al. | 219/121.48 |
| 2005/0035093 A1 * | 2/2005 | Yamaguchi et al. | 219/121.39 |
| 2006/0151448 A1 | 7/2006 | Abram | |
| 2009/0312862 A1 * | 12/2009 | Fagan | 700/160 |
| 2010/0176096 A1 * | 7/2010 | Koike et al. | 219/121.44 |
| 2013/0186870 A1 * | 7/2013 | Phillip et al. | 219/121.44 |

* cited by examiner

*Primary Examiner* — Mark Paschall
(74) *Attorney, Agent, or Firm* — Mark C. Young; Stinson Leonard Street LLP

(57) ABSTRACT

A method of controlling the position of a tilt/tilt style plasma arc torch relative to a workpiece for a bevel cutting operation is provided that includes: calculating a bevel pivot length, wherein the bevel pivot length is a function of a torch height; piercing the workpiece with the plasma arc torch; adjusting a position of the plasma arc torch by at least one linear offset value based on the bevel pivot length; rotating the plasma arc torch about its center of rotation to the desired cutting angle and maintaining a torch center point; and translating the plasma arc along its longitudinal axis to maintain a desired arc voltage between the plasma arc torch and the workpiece.

20 Claims, 8 Drawing Sheets

ΔX=BPL sin A

ΔY= -BPL cos A sin C

ANGLED CUT HEIGHT CONTROL SYSTEM FOR A PLASMA ARCH TORCH

FIELD

The present invention relates generally to plasma arc torches and more particularly to a method for controlling the plasma arc torch to make angled cuts.

BACKGROUND

Plasma arc torches, also known as electric arc torches, are commonly used for cutting, marking, gouging, and welding metal workpieces by directing a high energy plasma stream consisting of ionized gas particles toward the workpiece. To make a cut perpendicular to the workpiece, the plasma arc torch is generally maintained perpendicular to the workpiece and at a predetermined height from the workpiece to maintain a desired arc voltage for optimal cutting operation.

When a bevel or angled cut is desired, the plasma arc torch is rotated or tilted to define an angle equal to the desired bevel cut angle. When the plasma arc torch is in a tilted position, controlling the position of the plasma arc torch relative to the workpiece becomes difficult and time consuming. The torch height and the thickness of the workpiece affect the arc voltage, which in turn affects the cut quality. After the plasma arc torch is rotated, the arc voltage between the plasma arc torch and the workpiece changes from the desired arc voltage due to the changed thickness of the workpiece along the desired cutting surface. Therefore, the torch height needs to be adjusted to maintain the desired arc voltage. Typically, the torch height is adjusted by raising or lowering the plasma arc torch vertically and in a direction perpendicular to the workpiece. When the plasma arc torch is raised or lowered, however, the longitudinal axis of the titled plasma arc torch is shifted away from the desired cut location, resulting in a bevel cut at the wrong location. Offset compensations are typically used to move the plasma arc torch back to the desired location. The procedure of adjusting the torch position while maintaining the torch height is time consuming and requires much setup and testing for accuracy.

SUMMARY

In one form, a method of controlling the position of a tilt/tilt style plasma arc torch relative to a workpiece for a bevel cutting operation is provided that includes: calculating a bevel pivot length, which is a function of a torch height; piercing the workpiece with the plasma arc torch; adjusting a position of the plasma arc torch by at least one linear offset value based on the bevel pivot length; rotating the plasma arc torch about its center of rotation to the desired cutting angle and maintaining a torch center point; and translating the plasma arc along its longitudinal axis to maintain a desired arc voltage between the plasma arc torch and the workpiece.

In another form, a method of controlling the position of a tilt/rotate style plasma arc torch relative to a workpiece for a bevel cutting operation is provide that includes: piercing the workpiece with the plasma arc torch; rotating the plasma arc torch about its center of rotation to a desired cutting angle to maintain a torch center point; and translating the plasma arc along its longitudinal axis to maintain a desired arc voltage between the plasma arc torch and the workpiece.

In yet another form, a method of controlling the position of a plasma arc torch relative to a workpiece for a bevel cutting operation is provided that includes: translating the plasma arc along its longitudinal axis to maintain a desired arc voltage between the plasma arc torch and the workpiece after the plasma arc torch has been rotated to a desired cutting angle for the bevel cutting operation, followed by adjusting the plasma arc torch vertically (in the Z-axis) based on changes in contour of the workpiece.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DRAWINGS

The present invention will become more fully understood from the detailed description and the accompanying drawings, wherein.

Figure 8:
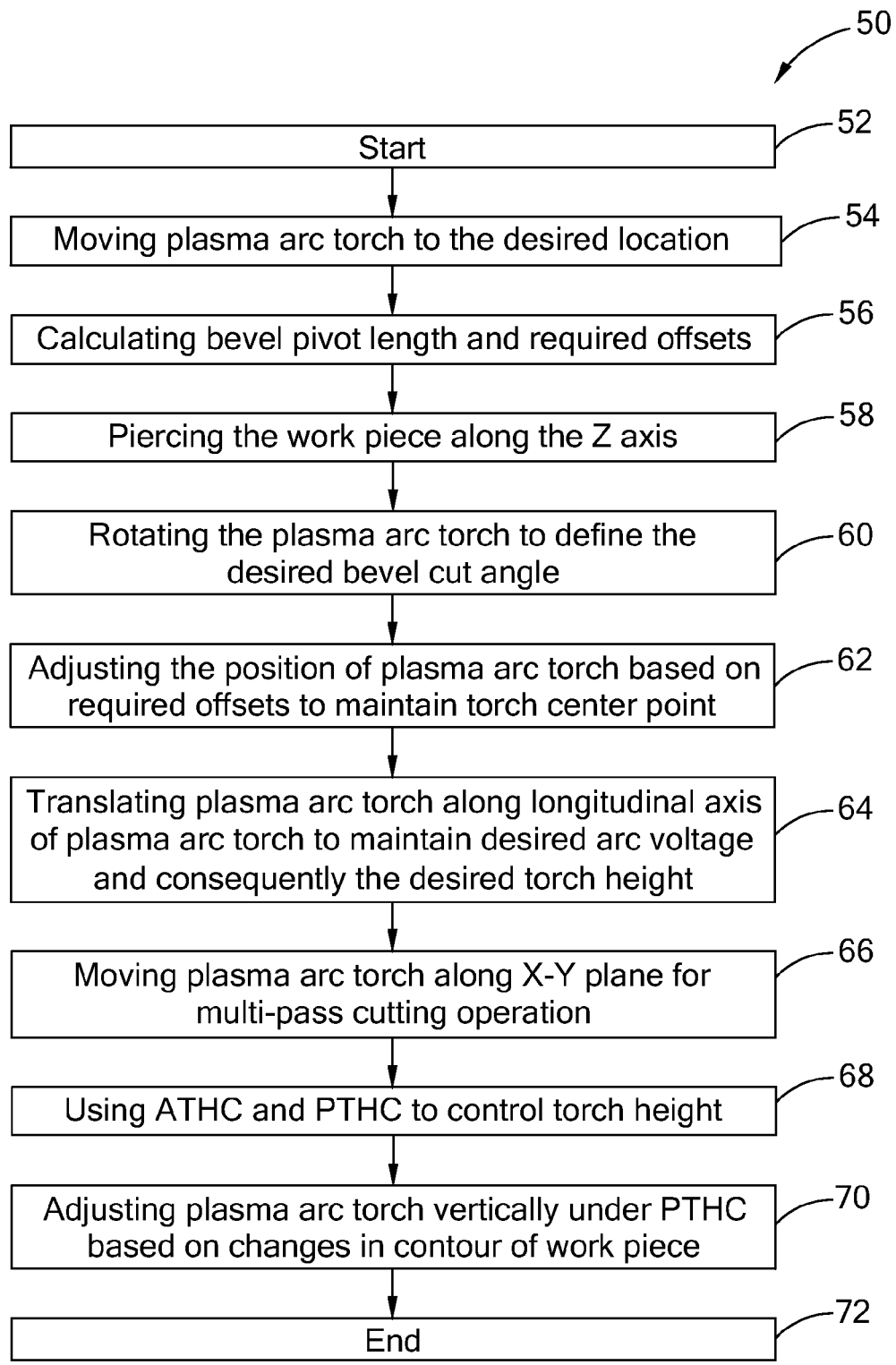
Figure 9:
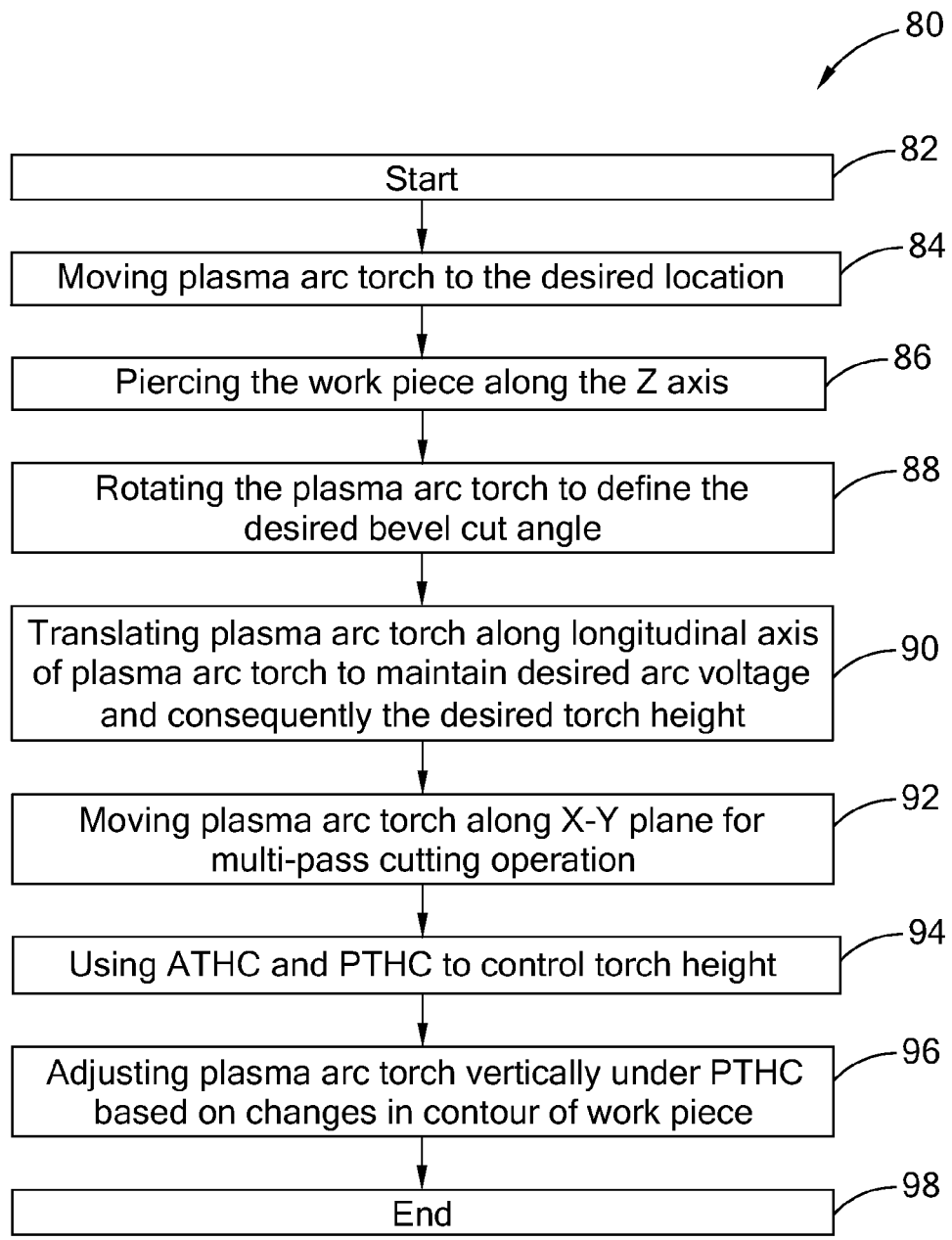

FIG. 8 is a flow diagram of a method of controlling the position of a tilt/tilt style plasma arc torch relative to a workpiece for a bevel cutting operation in accordance with the principles of the present disclosure; and FIG. 9 is a flow diagram of a method of controlling the position of a tilt/rotate style plasma arc torch relative to a workpiece for a bevel cutting operation in accordance with the principles of the present disclosure.

DETAILED DESCRIPTION

The following description of the preferred embodiments is merely exemplary in nature and is in no way intended to limit the invention, its application, or uses.

Figure 1:
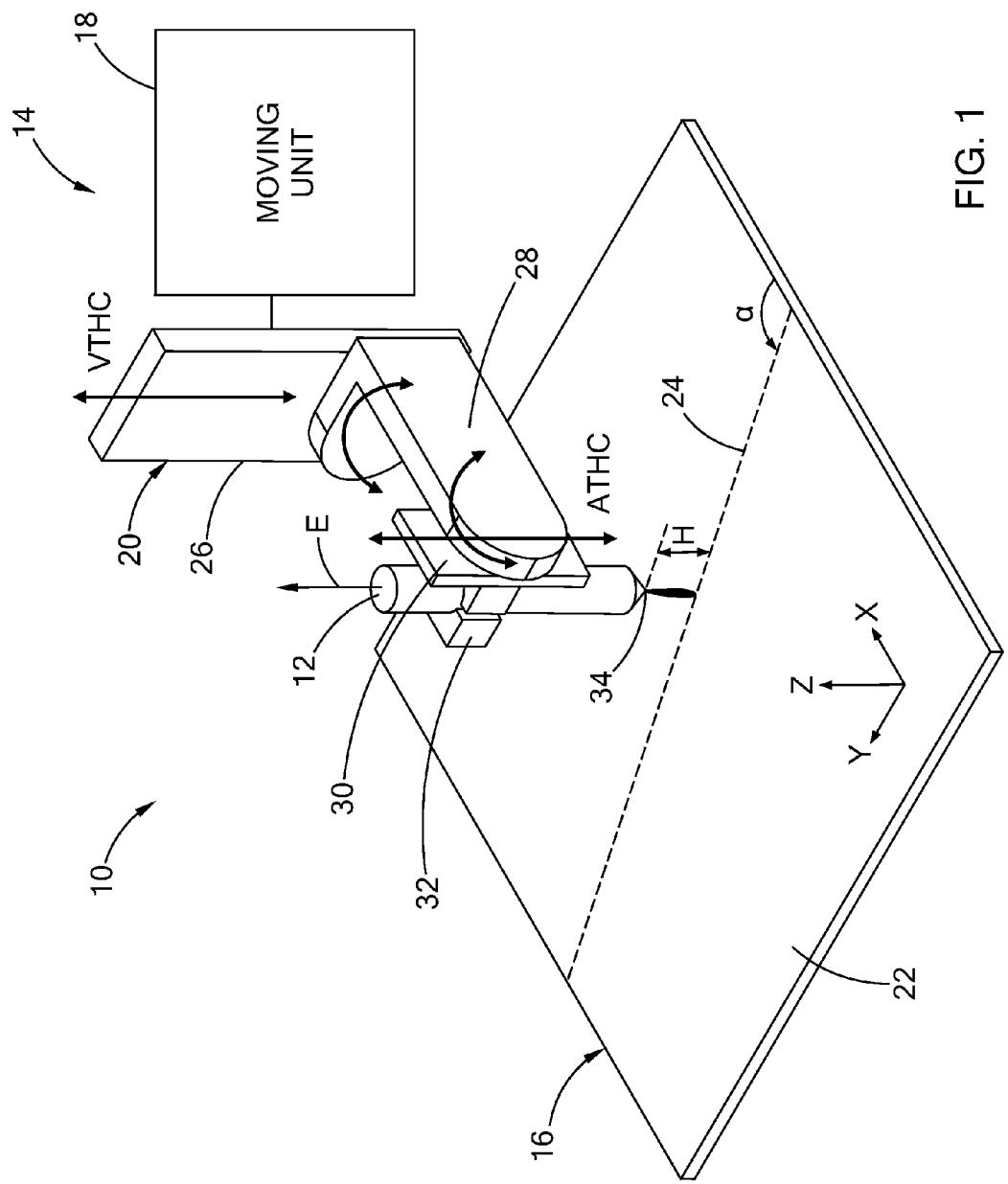
FIG. 1 is a perspective view of an automated plasma arc torch apparatus constructed in accordance with the principles of the present disclosure, wherein a plasma arc torch is disposed above a workpiece and in a vertical position.

Referring to FIG. 1, a plasma arc torch apparatus 10 constructed in accordance with the principles of the present disclosure includes a plasma arc torch 12 and a positioning system 14 that supports and positions the plasma arc torch 12 above a workpiece 16. The plasma arc torch 12 is shown in a vertical position in FIG. 1. The positioning system 14 includes a moving unit 18 and an adjusting unit 20. The moving unit 18 moves the plasma arc torch 12 along an upper surface 22 of the workpiece 16 (along the X-Y plane) to a predetermined (desired) cut location. The adjusting unit 20 adjusts an angle of the plasma arc torch 12 relative to the upper surface 22 of the workpiece 16 so that a bevel cut 24 with a predetermined bevel cut angle γ and a predetermined bevel tangent angle α may be formed in the workpiece 16.

The bevel tangent angle α is the angle of the cut 24 relative to the X-axis on the X-Y plane. The adjusting unit 20 also adjusts the height of the plasma arc torch 12 measured from the upper surface 22 of the workpiece 16 to the tip end 34 of the plasma arc torch 12 for optimal cut quality.

As further shown, the adjusting unit 20 includes a vertical member 26 translatable along the Z-axis, a primary rotating member 28 rotatably mounted to the vertical member 26, a secondary rotating member 30 rotatably mounted to the primary rotating member 28, and a longitudinal translating member 32 longitudinally movable relative to the secondary rotating member 30. The plasma arc torch 12 is mounted to the longitudinal translating member 32. The vertical member 26 extends vertically along the Z-axis to adjust a torch height H vertically. The vertical member 26 is used for vertical torch height control (VTHC), which will be described in more detail below. The primary rotating member 28 is rotatable around the X-axis to control a primary tilt axis angle (C) measured in the Y-Z plane from the Z-axis. The secondary rotating member 30 is rotatable around the Y-axis to control a secondary tilt axis angle (A) measured in the X-Z plane from Z-axis. The longitudinal translating member 32 is translatable relative to the secondary rotating member 30 so that the position of the plasma arc torch 12 may be adjusted along a longitudinal axis E of the plasma arc torch 12. The longitudinal translating member 32 is used for annular torch height control (ATHC), which will be described in more detail below.

Figure 2:
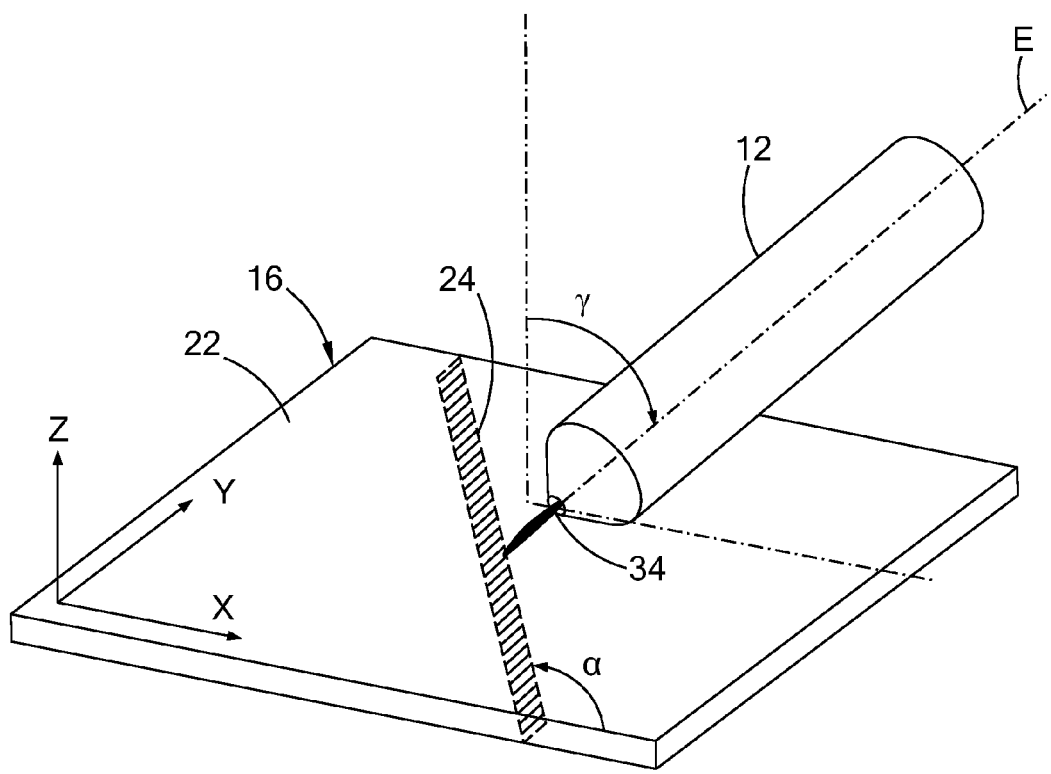
FIG. 2 is a schematic perspective view of a plasma arc torch of an automatic plasma arc torch apparatus disposed above a workpiece and in a tilted position.

As clearly shown in FIG. 2, the plasma arc torch 12 is rotated to a tilted position to make a bevel cut 24 through the workpiece 16. The desired bevel cut 24 has a bevel cut angle γ relative to Z-axis and a cut tangent angle α relative to X-axis on the X-Y plane. As clearly shown in FIG. 1, to rotate or tilt the plasma arc torch 12, the primary rotating member 28 and the secondary rotating member 30 may be rotated around the X-axis and the Y-axis, respectively, so that the plasma arc torch 12 is properly oriented relative to Z-axis to make the desired bevel cut 24 with the right bevel cut angle γ and the right cut tangent angle α. The bevel cut angle γ of the bevel cut 24 (see FIGS. 3 and 4) is equal to the angle of the plasma arc torch 12 relative to the Z-axis. When the plasma arc torch 12 is in a vertical position, the bevel cut angle γ is 0 degree and the plasma arc torch 12 is perpendicular to the workpiece 16.

Figure 3:
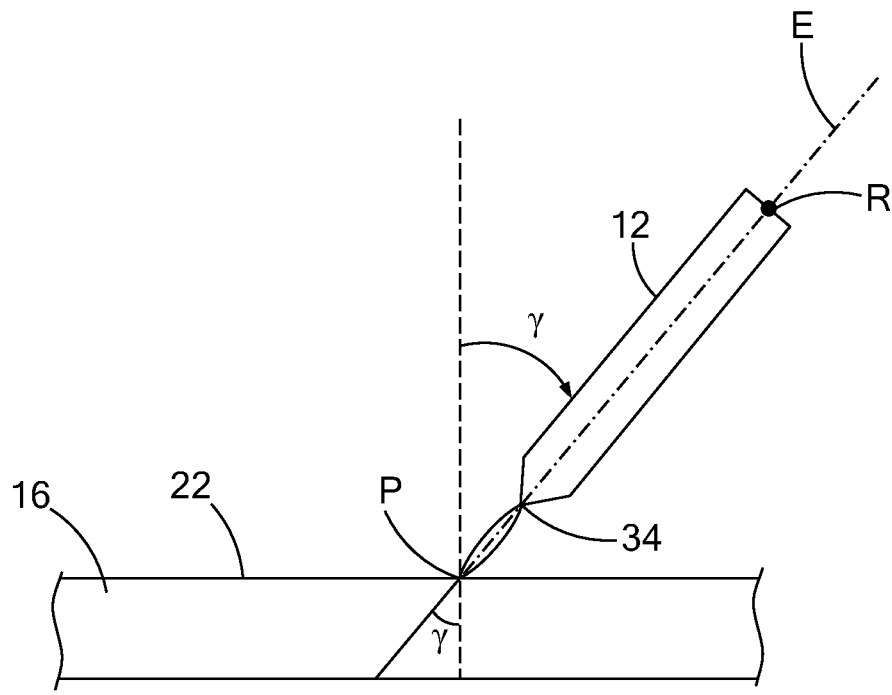
FIG. 3 is a schematic view of a plasma arc torch relative to a workpiece after the plasma arc torch is rotated in a tilt/rotate style plasma arc torch system.

Referring to FIG. 3, the plasma arc torch apparatus 10 may be a tilt/rotate style system or a tilt/tilt style system. In the tilt/rotate style system, the plasma arc torch 12 is titled and rotated in such a way that the torch center point P is maintained. The torch center point P is the intersecting point of the longitudinal axis E of the plasma arc torch 12 and the upper surface 22 of the workpiece 16 and the point where the plasma stream first impinges on the workpiece 16. The torch center point P affects the location of the bevel cut 24 and thus should be properly controlled for precise control of the cut location. The tilt/rotate system is designed to mechanically maintain the torch center point P after the plasma arc torch 12 is rotated from the vertical position to the tilted position. Therefore, the plasma arc torch 12 will make the bevel cut 24 at the desired location after the plasma arc torch 12 is rotated. No lateral offsets in the X-Y plane are necessary.

Figure 4:
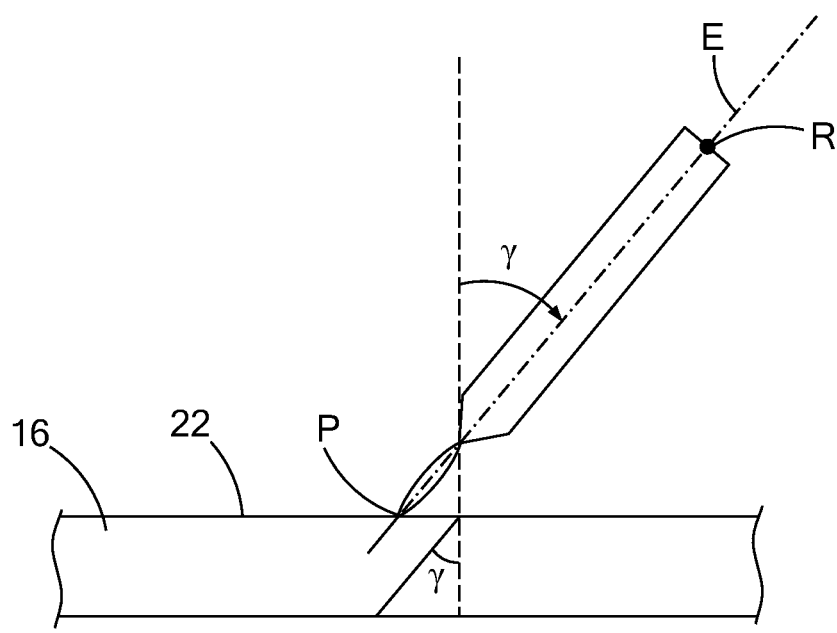
FIG. 4 is a schematic view of a plasma arc torch relative to a workpiece after the plasma arc torch is rotated in a tilt/tilt style plasma arc torch system.

As shown in FIG. 4, in a tilt/tilt system, the torch center point P is not maintained after the plasma arc torch 12 is rotated. To make the bevel cut 24 at the right location, offsets in the X-Y plane are needed. Therefore, the plasma arc torch apparatus 10 may include an offset determination logic (not shown) to determine the desired offsets ΔX, ΔY, ΔZ in the X, Y, and Z axes based on the desired bevel cut angle γ and the desired bevel tangent angle α.

Figure 5:
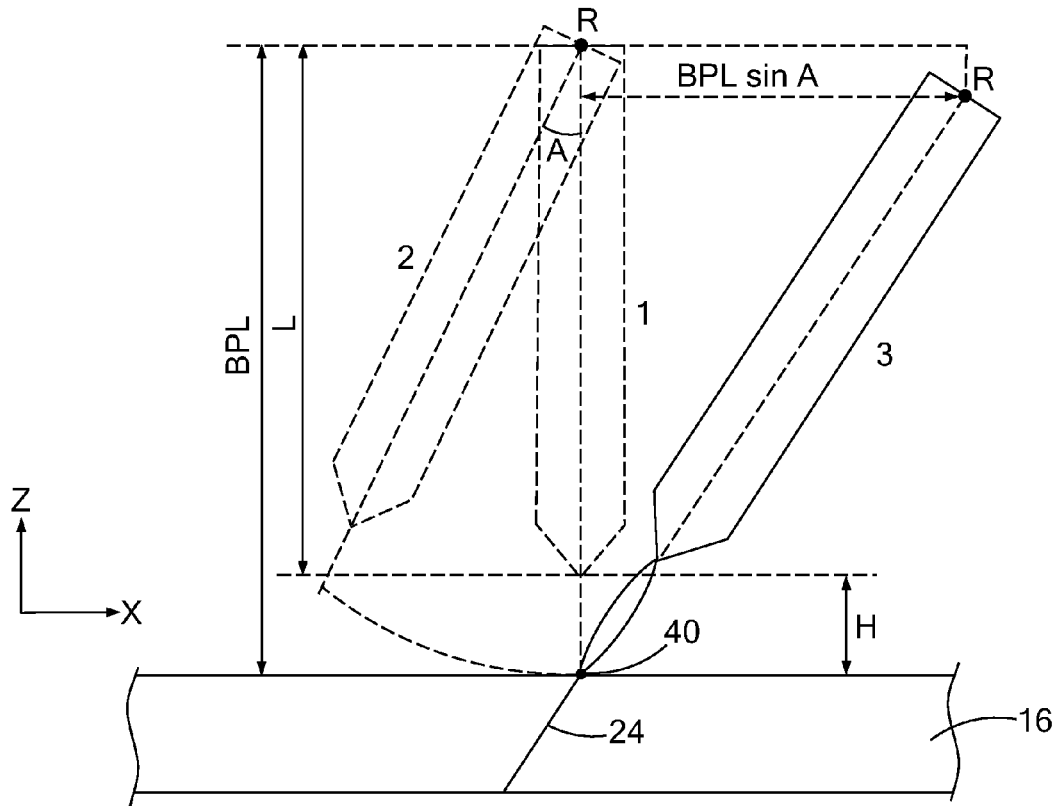
FIG. 5 is a schematic view of a plasma arc torch showing a shift of a plasma arc torch in the X-Z plane after the plasma arc torch is rotated around a center of rotation.

Referring to FIGS. 1 and 5, to make a bevel cut 24 through the workpiece 16, the plasma arc torch 12 is positioned perpendicular to the workpiece 16 and moved by the moving unit 18 to Position 1 at a predetermined location. In Position 1, the tip end 34 of the plasma arc torch 12 is immediately above an upper end 40 of the desired bevel cut 24. The plasma arc torch 12 is translated along the Z-axis to maintain a desired torch height H. The workpiece 16 may be pierced first in the vertical direction when the plasma arc torch 12 is in the vertical position. Next, the plasma arc torch 12 is tilted or rotated around a center of rotation R by the primary rotating member 28 and the second rotating member 30 to Position 2 based on the desired bevel cut angle γ and the desired bevel tangent angle α. The primary rotating member 28 rotates the plasma arc torch 12 to define a primary tilt axis angle C relative to the Z-axis and the secondary rotating member 30 rotates the plasma arc torch 12 to define a secondary tilt axis angle A relative to the Z-axis. As a result, the plasma arc torch 12 defines a resultant angle γ relative to the Z-axis, which is equal to the bevel cut angle γ of the desired bevel cut 24. The primary tilt axis angle C and the secondary tilt axis angle A are defined by the following equations:

$$C = \tan^{-1}[\cos(\alpha)\tan(\gamma)] \qquad \text{Equation (1)}$$

$$A = \tan^{-1}[-\sin(\alpha)\tan(\gamma)\cos(C)] \qquad \text{Equation (2)}$$

where γ is the bevel cut angle, and
α is the bevel tangent angle.

When the plasma arc torch 12 is rotated to Position 2, the tip end 34 of the plasma arc torch 12 is moved away from the desired bevel cut location. In other words, the torch center point P, which coincides with the upper end 40 of the desired bevel cut 24, is moved and not maintained. To maintain the torch center point P at the right location, the plasma arc torch 12 is translated on the X-Y plane to Position 3 so that the longitudinal axis E of the plasma arc torch 12 is properly maintained at a predetermined location relative to the workpiece 16 to make the bevel cut 24 at the desired location.

As clearly shown in FIG. 5 where the plasma arc torch 12 is viewed on the X-Z plane, the plasma arc torch 12 is shown to be rotated a secondary tilt axis angle A around the center of rotation R and the tip end 34 of the plasma arc torch 12 is moved away from the desired bevel cut location in the −X direction. The actual torch pivot length from the center of rotation R to the tip end 34 of the plasma arc torch 12 is L. A bevel pivot length (BPL) is an imaginary torch pivot length measured from the upper surface 22 of the workpiece 16 to the center of rotation R along the longitudinal axis E of the plasma arc torch 12, taking into account the torch height H. Therefore, BPL=L+H. BPL may vary depending on the location of the center of rotation R.

BPL is used to more precisely and easily determine the required offsets in the X, Y, and Z axes. As clearly shown in FIG. 5, the offset ΔX in the X-axis may be defined as $$\Delta X = \text{BPL} \sin(A) \qquad \text{Equation (3)}$$

where BPL is the bevel pivot length, and
A is the secondary tilt axis angle.

The required offset ΔX in the X-axis is the distance between the center of rotation R in the Position 2 and the center of rotation R in Position 3 along the X-axis. When the plasma arc torch 12 is translated from Position 2 to Position 3 based on the offset, the torch center point P coincides with the upper end 40 of the bevel cut 24. Therefore, the plasma arc torch 12 in Position 3 can make the bevel cut 24 at the right location.

Figure 6:
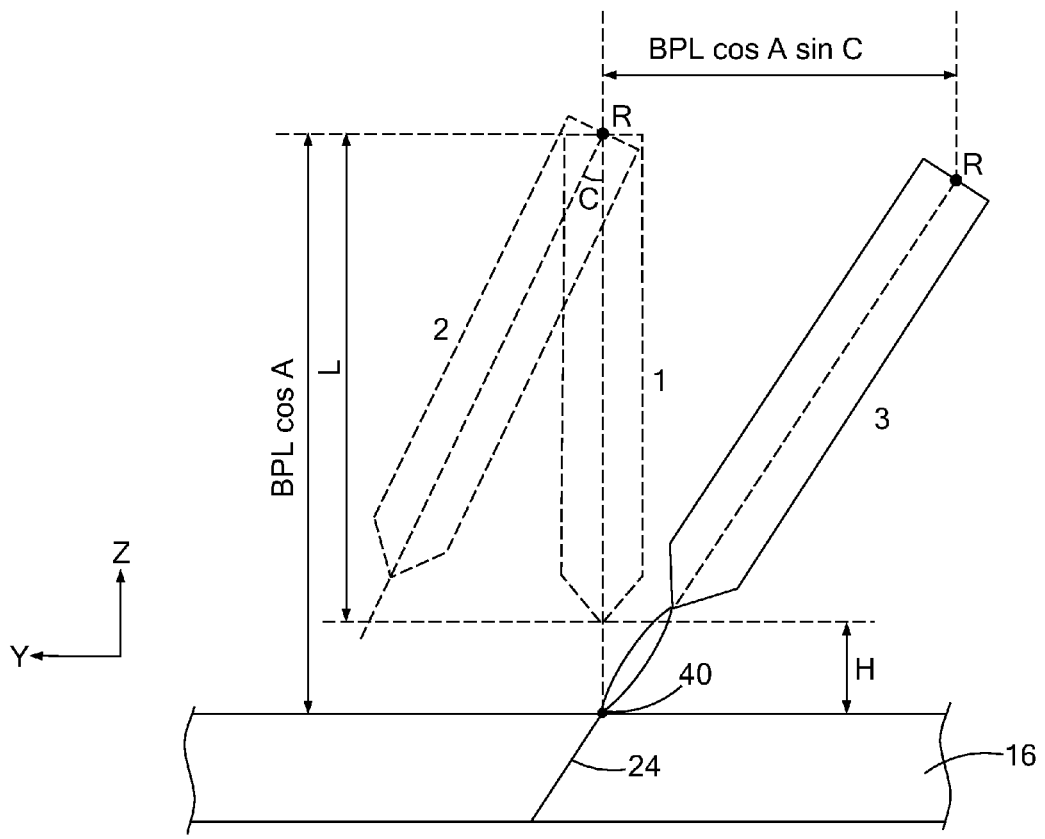
FIG. 6 is a schematic view of a plasma arc torch showing a shift of a plasma arc torch in the Y-Z plane after the plasma arc torch is rotated around a center of rotation.

Referring to FIG. 6, where the plasma arc torch 12 is viewed on the Y-Z plane, the plasma arc torch 12 is rotated around the center of rotation R to define a primary tilt axis angle (C) relative to the Z-axis. Similarly, the tip end 34 of the plasma arc torch 12 is moved away from the desired bevel cut location. The required offset in the Y-axis (ΔY) to move the plasma arc torch 12 back to the desired bevel cut location is defined as $$\Delta Y = -\text{BPL}\cos(A)\sin(C) \quad \text{Equation (4)}$$

where BPL is the bevel pivot length,
  A is the secondary tilt axis angle measured from the vertical axis Z, and
  C is the primary tilt axis angle measured from the vertical axis Z.

It is noted when the plasma arc torch 12 is rotated both around the X-axis (in the Y-Z plane) and the Y-axis (in the X-Z plane), the length of BPL projected onto the Y-Z plane or the X-Z plane is shorter than BPL. Therefore, in the Y-Z plane, the length of the line from the workpiece 16 to the center of rotation R projected onto the Y-Z plane is BPL cos(A), and thus the desired offset in the Y-axis is −[BPL cos(A)]·sin(C).

In contrast, BPL, instead of BPL cos(C), the projected length on the X-Z plane, is used in Equation (3) because the effect of primary title axis angle (C) on the X-Z plane has been properly compensated for by the secondary tilt axis angle (A), which is a function of the primary tilt axis angle (C).

Figure 7:
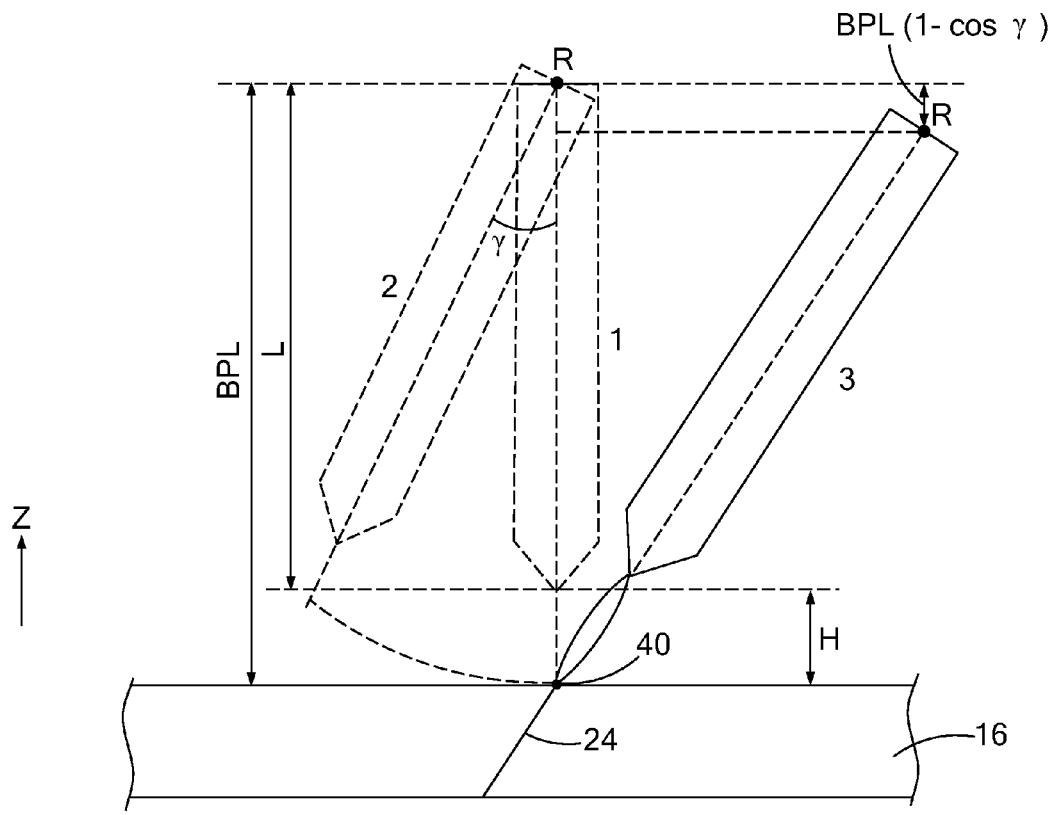
FIG. 7 is a schematic view of a plasma arc torch showing a shift of a plasma arc torch in the Z-axis after the plasma arc torch is rotated around a center of rotation.

Referring to FIG. 7, after the plasma arc torch 12 is rotated around the center of rotation R to define an angle γ relative to the Z-axis in Position 2, the torch height H is increased. The increased height is defined as BPL(1−cos(γ)). Therefore, the required offset ΔZ in the Z-axis γ to maintain the original torch height H is defined as $$\Delta Z = \text{BPL}[\cos(\gamma) - 1] \quad \text{Equation (5)}$$

where BPL is the bevel pivot length, and
γ is the bevel cut angle measured from the vertical axis Z.

Equations (3), (4) and (5) define the required offsets ΔX, ΔY and ΔZ for a tilt/tilt system in the X, Y, and Z axes after the plasma arc torch 12 is rotated. In a tilt/rotate system, however, a mechanism is used to mechanically maintain the torch center point P. Therefore, no linear offsets (in the X and Y axes) are required. However, a vertical offset in the Z-axis may still be necessary due to the changed thickness of the workpiece 16 along the bevel cut section.

BPL is a function of the torch height H. The torch height H may be determined differently depending on the applications and thus the desired offsets ΔX, ΔY and ΔZ in Equations 3, 4 and 5 may vary depending on applications.

For example, when the plasma arc torch 12 is rotated to the desired bevel cut angle after the plasma arc torch 12 pierces the workpiece 16 and when the offsets in the X and Y axes necessary for multi-pass cutting operation are predetermined based upon the bevel cut angle and the workpiece dimensions, the BPL is defined as $$\text{BPL} = L + H_C \quad \text{Equation (6)}$$

where L=distance from the tip end of the plasma arc torch to the center of rotation, and
  $H_C$=cut height, which is the distance from the upper surface of the workpiece to the torch end when the torch is perpendicular to the workpiece.

In another situation, when the plasma arc torch 12 is rotated during piercing and when the offsets in the X and Y axes necessary for multi-pass cutting operation are predetermined based on the bevel cut angle and the dimensions of the workpiece, BPL is defined as $$\text{BPL} = L + H_P \quad \text{Equation (7)}$$

where L=distance from the tip end of the plasma arc torch to the center of rotation, and $H_p$=pierce height, which is the distance from the upper surface of the workpiece to the tip end of the plasma arc torch when the torch is perpendicular to the workpiece. Generally speaking, $H_P$ is larger than $H_C$.

In still another situation, when the torch center point is maintained and when offsets in the X and Y directions are not necessary, BPL is defined as $$\text{BPL} = L + K \quad \text{Equation (8)}$$

wherein L=distance from the tip end of the plasma arc torch to the center of rotation R, and K=constant which could be a function of cut height, pierce height, kerf width, land dimension, or other parameters.

The torch center point may be maintained because it is set to be a function of the dimensions of the workpiece or because some parameters, such as kerf width, is used.

Regardless of how BPL is determined, BPL depends on the torch height and is used to determined the required offsets ΔX, ΔY and ΔZ in the X, Y, and Z axes to maintain the torch center point and at the original torch height so that the plasma arc torch 12 can make the desired bevel cut at the right location with the right angle.

Referring to FIG. 8, a method 50 of controlling the position of a tilt/tilt style plasma arc torch relative to a workpiece 16 for a bevel cutting operating starts in step 52. The plasma arc torch 12 is first moved to the desired location for the desired bevel cut in step 54. The bevel pivot length (BPL) is calculated and the desired offsets ΔX, ΔY, ΔZ along the X, Y and Z axes are determined by Equations (3), (4) and (5) based on BPL, the desired bevel cut angle γ, and the desired cut tangent angle α in step 56. The plasma arc torch 12 pierces the workpiece 16 along the Z-axis (i.e., perpendicular to the workpiece) in step 58. After the workpiece 16 is pierced, the plasma arc torch 12 is rotated around the center of rotation R to define the desired bevel cut angle γ in step 60. The position of the plasma arc torch 12 is adjusted by at least one of offsets ΔX, ΔY, ΔZ in the X, Y and Z axes to maintain the torch center point in step 62.

Thereafter, the plasma arc torch 12 is moved along its longitudinal axis E to maintain a desired arc voltage between the plasma arc torch 12 and the workpiece 16 and consequently a desired torch height for optimal cut quality in step 64. This step is called angular torch height control (ATHC) and the torch height of the plasma arc torch 12 is controlled under ATHC mode. ATHC takes place in the first few seconds after the plasma arc torch 12 has pierced the workpiece 16 and has been tilted to the proper angle. ATHC may be accomplished by controlling the longitudinal translating member 32 of the positioning system 20. When the torch height is controlled and maintained along the angular direction (the longitudinal axis E) of the plasma arc torch 12 based on the arc voltage, the torch center point is maintained so that the plasma arc torch 12 can make the bevel cut at the desired location.

After the plasma arc torch 12 is moved along the longitudinal axis E by ATHC to maintain a desired arc voltage, the ATCH is locked on to the desired arc voltage. The plasma arc torch 12 is then moved along the X-Y plane for a multi-pass cutting operation in step 66. During the multi-pass cutting operation, the torch center point may be maintained or varied. A combination of ATHC and PTHC is used to achieve proper control of the torch height and thus the proper part dimensions during the multi-pass cutting operation in step 68. Once the ATHC is "locked on" to maintain the desired arc voltage, PTHC will retake control and raise/lower the plasma arc torch 12 in the vertical axis Z in response to changes in contour of the workpiece in step 70. For example, the workpiece 12 may have in-plate height change, uneven surface, existence of splattered metal. The changes in contour results in a changed arc voltage between the workpiece and the tip end 34 of the plasma arc torch 12 along the longitudinal axis E of the plasma arc torch 12. In this situation, the torch height is adjusted in the vertical axis Z by the vertical translating member 26 of the positioning system 20 under vertical torch height control (VTHC) mode. The method 50 ends in step 72.

Referring to FIG. 9, a method 80 of controlling the position of a tilt/rotate style plasma arc torch relative to a workpiece for a bevel cutting operation starts in step 82. The plasma arc torch 12 is moved to a desired location in step 84. The plasma arc torch first pierces the workpiece along the Z-axis and perpendicular to the workpiece in step 86. The plasma arc torch 12 is then rotated about its center of rotation R to a desired bevel cut angle γ in step 88. Due to the design of the tilt/rotate style plasma arc torch, the torch center point is automatically maintained and the longitudinal axis E of the plasma arc torch 12 is maintained at the desired position relative to the workpiece 16 to make the bevel cut at the desired location. Therefore, offsets in the X, Y and Z axes are not needed.

The plasma arc torch 12 is then translated along its longitudinal axis E under the angular torch height control (ATHC) mode to maintain a desired arc voltage between the plasma arc torch 12 and the workpiece 16 in step 90. After the workpiece 16 is pierced, the plasma arc torch 12 may be moved along the X-Y plane for multi-pass cutting operation in step 92. During the multi-pass cutting operation, the plasma arc torch 12 is switched to a mode where both ATHC and VTHC are used to control the torch height in step 94. The plasma arc torch 12 may be adjusted vertically and along the Z-axis under PTHC based on changes in contour of workpiece in step 96. The torch center point may be maintained or varied for multi-pass cutting operation. The method ends in step 98.

With the calculated offsets based on the torch height and the angular torch height control (ATHC) along the longitudinal axis E of the plasma arc torch, the torch height of the plasma arc torch can be properly and easily controlled after the plasma arc torch is rotated or tilted. The ATHC allows the torch center point P to be maintained when the torch height is adjusted. During multi-pass cutting operation, the angular torch height control (ATHC) and perpendicular torch height control (PTHC) are used to maintain the torch height. The plasma arc torch may be adjusted vertically and along the vertical axis Z in response to changes in contour of the workpiece. Therefore, the position and orientation of the plasma arc torch can be relatively easily determined and controlled based on the calculated offsets and the torch height control along the longitudinal axis according to the present disclosure.

The description of the invention is merely exemplary in nature and, thus, variations that do not depart from the substance of the invention are intended to be within the scope of the invention. Such variations are not to be regarded as a departure from the spirit and scope of the invention.

What is claimed is:

1. A method of controlling the position of a tilt/tilt style plasma arc torch relative to a workpiece for a bevel cutting operation comprising:
    calculating a bevel pivot length, which is a function of a torch height;
    piercing the workpiece with the plasma arc torch;
    adjusting a position of the plasma arc torch by at least one linear offset value based on the bevel pivot length;
    rotating the plasma arc torch about its center of rotation to the desired cutting angle and maintaining a torch center point; and
    translating the plasma arc along its longitudinal axis to maintain a desired arc voltage between the plasma arc torch and the workpiece.

2. The method according to claim 1, wherein the position of the plasma arc torch is adjusted by at least one of a lateral offset (ΔY), longitudinal offset (ΔX), or vertical offset (ΔZ).

3. The method according to claim 2, wherein the offset (ΔX) in the X-axis, the offset (ΔY) in the Y-axis, and the offset (ΔZ) in the Z-axis are calculated as:

$$\Delta X = \text{Required Change in Position along } X\text{-Axis} = L\sin(A)$$

$$\Delta Y = \text{Required Change in Position along } Y\text{-Axis} = -L\cos(A)\sin(C)$$

$$\Delta Z = \text{Required Change in Position along } Z\text{-Axis} = L[\cos(\gamma)-1]$$

where,
    C = Primary Tilt Axis Angle
    A = Secondary Tilt Axis Angle
    L = Bevel Pivot Length
    γ = Desired Bevel Cut Angle.

4. The method according to claim 1, wherein the plasma arc torch is adjusted vertically (in the Z-axis) based on changes in contour of the workpiece.

5. The method according to claim 1, wherein the torch center point is maintained during rotation of the torch.

6. The method according to claim 1, wherein the workpiece is pierced with the longitudinal axis of the plasma arc torch perpendicular to the workpiece.

7. The method according to claim 1, wherein the torch center point is varied for a multi-pass bevel cut operation.

8. The method according to claim 1, wherein the plasma arc torch is operated under an angular torch height control mode immediately after the workpiece is pierced and operated under both the angular torch height control mode and a vertical torch height control mode for a multi-pass cutting operation.

9. The method according to claim 8, wherein the plasma arc torch is translated along the longitudinal axis of the plasma arc torch under the angular torch height control mode to maintain the desired arc voltage between the plasma arc torch and the workpiece.

10. The method according to claim 8, wherein the plasma arc torch is translated along a direction perpendicular to the workpiece under the vertical torch height control mode in response to changes in contour of workpiece.

11. The method according to claim 10, wherein the changes in contour of the workpiece include in-plate height changes, uneven surfaces, and existence of splattered metal.

12. A method of controlling the position of a tilt/rotate style plasma arc torch relative to a workpiece for a bevel cutting operation comprising:
    piercing the workpiece with the plasma arc torch;
    rotating the plasma arc torch about its center of rotation to a desired cutting angle to maintain a torch center point; and
    translating the plasma arc along its longitudinal axis to maintain a desired arc voltage between the plasma arc torch and the workpiece.

13. The method according to claim 12, wherein the plasma arc torch is adjusted vertically based on changes in contour of the workpiece.

14. The method according to claim 12, wherein the torch center point is maintained during rotation of the torch.

15. The method according to claim 12, wherein the workpiece is pierced with the longitudinal axis of the plasma arc torch perpendicular to the workpiece.

16. The method according to claim 12, wherein the torch center point is varied for a multi-pass bevel cut operation.

17. The method according to claim 12, wherein the plasma arc torch is controlled under both an angular torch height control mode and a vertical torch height control for a multi-pass cutting operation.

18. The method according to claim 17, wherein the plasma arc torch is translated along the longitudinal axis of the plasma arc torch under the angular torch height control mode to maintain the desired arc voltage between the plasma arc torch and the workpiece.

19. The method according to claim 17, wherein the plasma arc torch is translated along a direction perpendicular to the workpiece under the vertical torch height control mode in response to changes in contour of workpiece.

20. A method of controlling the position of a plasma arc torch relative to a workpiece for a bevel cutting operation comprising translating the plasma arc along its longitudinal axis to maintain a desired arc voltage between the plasma arc torch and the workpiece after the plasma arc torch has been rotated to a desired cutting angle for the bevel cutting operation, followed by adjusting the plasma arc torch vertically (in the Z-axis) based on changes in contour of the workpiece.

* * * * *